July 19, 1938.  O. M. EBELL  2,124,246
RAIL TRUCK
Filed Jan. 21, 1937
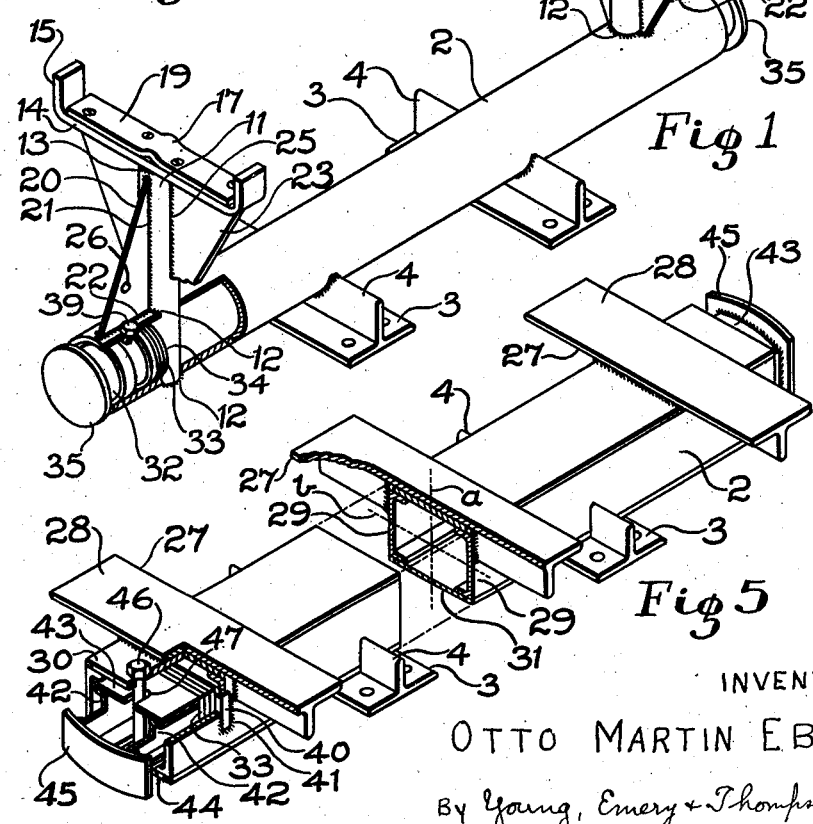
INVENTOR
OTTO MARTIN EBELL
By Young, Emery & Thompson
ATTORNEYS Patented July 19, 1938

2,124,246

UNITED STATES PATENT OFFICE 2,124,246

RAIL TRUCK

Otto Martin Ebell, Maraisburg, Union of South Africa, assignor of one-half to Couzin & Attwood (Proprietary) Limited, Johannesburg, Transvaal Province, Union of South Africa Application January 21, 1937, Serial No. 121,686
In Union of South Africa August 21, 1936

14 Claims. (Cl. 105—264)

This invention relates to rail trucks of the kind commonly employed in mining, tunnelling, surface excavations and factories for transporting ore, broken stone, cane and other bulky crops, and similar rough materials on narrow gauge tracks and usually of a small size capable of being pushed by a single person. A typical truck of this kind consists of a chassis, a sheet metal open-topped body thereon and two unsprung axles fitted with wheels; and usually has no buffer mechanism or draw gear.

A standard form of the chassis of such a truck comprises a horizontal frame, of channel steel, having two straight sides and rounded ends. When the truck has a tipping body, the chassis also includes pressed plate body-supporting pillars mounted on the upper side of the frame and providing at their upper ends saddles on which rockers at the ends of the body rest. A fixed body, on the other hand, is secured directly to the frame. The two axles are directly mounted on the underside of the frame sides; being either bolted directly thereto by U-bolts when the wheels rotate on the axles, or seated in inverted pedestal bearings fixed beneath the frame when the axles are live. The rounded ends of the frame receive the buffing impacts to which the truck may be subjected.

A frame chassis as described is liable to bending and fracture by the buffing impacts on its ends. It is an object of the invention to provide a chassis construction which is inherently stronger against buffing impacts than the frame chassis and which in its preferred form is no more expensive to construct than the latter.

According to the invention, the chassis of a truck of the kind described consists of a single straight longitudinal, with means thereon for supporting the truck body and means thereon for supporting it on wheel axles.

The longitudinal member is straight and single in the sense that during buffing it is subjected substantially only to compressive stresses. It may thus be and preferably is a one piece structure such as a length of pipe; but it may also be a built up structure of appropriate cross section like a compound girder, and preferably of a box or similar tubular section. Such a section is subjected, by buffing, substantially only to compressive stresses when the radius of gyration of its cross section about one principal axis of the section is not more than substantially twice the radius of gyration of said section about its other principal axis.

The ends at least of the longitudinal member are preferably hollow and are formed as sockets in each of which is inserted a simple form of shock absorbing buffer.

Reference is made to the accompanying drawing in which:

Figure 1 is a perspective view of one form of chassis.

Figures 2 and 3 show details thereof.

Figure 4 is an end view of a truck including the chassis of Figure 1 sectioned immediately behind the buffer.

Figure 5 is a perspective view of another form of chassis.

Referring to Figures 1, 2 and 3, the chassis comprises the single longitudinal member 2 which as shown is a single piece of metal pipe. 3, 3 indicate two axle bearers which are rigid with the pipe 2 and extend transversely to said tube. In the form shown they are of T sectioned structural metal, with the stem 4 of the T directed upward. Said stem 4 is cut away at 5, Figure 2 to fit around the pipe 2 from below and the T is welded to the pipe, thus firmly securing said parts together and also restoring the strength of the T section lost by the cut 5. Equally well, the pipe 2 may be slotted to receive the stem 4 and the edges of the slot welded to the latter.

The axles 6 shown in Figure 4 are of the fixed kind on the ends of which the wheels 7 are rotatably mounted. Said axles are accordingly rigidly clamped to the flat under surfaces of the bearers 3 as by U bolts 8; the usual pads 9 being interposed between the axle and the bearer to localize the clamping pressure on the axles.

In the case of a truck having a tipping body such as the standard form of body shown at 10, Figure 4, the supports for the body are rigid with the single longitudinal member 2. They comprise the posts 11, which are preferably lengths of structural sections, and, as shown, lengths of pipe passed through apertures of corresponding form cut to receive them in the upper and lower surfaces of the longitudinal member 2 and welded to the latter at 12, 12 around said apertures. Each post has mounted at its upper end, preferably by welding 13, the rocker saddle formed of a horizontal bar 14 bent up at its ends 15. The body 10 is provided at its ends with the usual angle iron rocker 16 which rests on the saddle and is so shaped as to roll thereon when the body is tilted so that the body is also translated towards whichever is the tipping side and discharges its contents well clear of the rail track. A projection 17 on the saddle engaging in a recess 18 in the rocker centralizes the body on the chassis when it is not being tipped.

The saddle surface on which the rocker bears is subject to wear and if this wear becomes excessive, the body correspondingly drops and is in danger of fouling the chassis, the clearance between which and the chassis is made small in order to keep down the total height of the truck. Truck chassis of the kind hitherto used are usually worked to destruction before the wear reaches the degree to cause the body to foul the chassis, but it has been found with chassis according to the present invention, their useful life is long enough to make the saddle wear a matter for consideration. According to the invention the wearing surface of the saddle and the projection 17 are provided by a wearing plate 19 which is bolted or otherwise secured to the saddle proper so that it may be renewed when worn.

Each post 11 is stiffened with the longitudinal member 2 by means of a fore and aft gusset or stay 20 welded to said parts respectively at 21 and 22. Similarly the saddle 14 is stiffened with the post 11 by means of the two transverse gussets or stays 23 welded to said parts at 24 and 25. Such stiffening of the saddle with the post is especially necessary because when the body is tipped, the load of the body is applied to the saddle near to one or other of the ends thereof. The pipe form of the longitudinal 2, acting as a hollow shaft, is particularly well adapted for transmitting the torque set up by this eccentric load, to the axle bearers 3.

A hole 26 in the gusset or stay provides a convenient means of attaching a chain or the like for coupling one truck to another, since the slope of the gusset or stay away from the buffer brings such hole 26 well back from the buffer hereafter described; so enabling the chain or the like, when not in use, to hang clear of the buffer.

When the truck body is non-tilting, the chassis is provided with two or more transverse body supports 27 instead of the posts and saddles. Such body supports are shown in Figure 5 as mounted on a box-sectioned longitudinal 2; but can equally well be applied to the pipe longitudinal of Figure 1. They may be beams of T or other section conformed and welded to the longitudinal 2 like the axle bearers 3, but positioned with their flat surfaces 28 uppermost to receive the body.

Figure 5 also shows the longitudinal 2 in the form of a built-up member of box-section, comprising the two channel members 29 and the upper and lower plates 30, 31 welded thereto. The radius of gyration of this section about its vertical axis $a$ being not more than twice its radius of gyration about its horizontal axis $b$, the whole section is subjected substantially only to compressive stresses during buffing. When a longitudinal of this kind is to be fitted with a tilting body, the members 27 are omitted and body supports like the posts 11 and saddles 14 of Figure 1 are provided.

The ends of the single longitudinal member are provided with buffing devices sufficiently yielding to reduce the severe buffing shocks which would occur without them. It is difficult with the existing frame form of chassis to provide a cheap and useful form of buffer, but this can be done readily with the tubular chassis of the present invention. Referring to Figure 1, each end of the pipe 2 beyond the intersection of the post 11 is utilized as the buffer socket; the post 11 forming the base of such socket. The buffer comprises a metal head 32 and a resilient pad 33 between said head and a pressure distributing plate 34 resting against the post. The pad 33 may consist of one or more rubber discs or rings.

The head 32 shown in Figures 1 and 3 consists of a short length of tube 34 of smaller diameter than the inside diameter of pipe 2. To the outer end of tube 34 is welded a dished metal plate 35 to form the contact surface of the buffer. The other end of the tube 34 is closed by a welded-on metal plate 36 of somewhat greater diameter than tube 34 and such as to slide easily within the pipe 2. A ring or annular series of stops 37 of the same diameter as plate 36 is welded onto the tube between its ends so as to leave a neck 38. When the buffer is in position a tap bolt 39 is screwed through the pipe 2 so that its end is in the neck 38 whereby it retains the buffer from displacement from its socket while allowing it to have the necessary longitudinal play.

In the Figure 5 construction and in other constructions in which the post 11 does not intersect the tube 2, a plate or structural section 40 forming the base of the socket is passed through slots in the side of the member 2 and is welded in said slots as indicated at 41. The buffer head shown in Figure 5 is constructed to conform to the rectangular cross section of the buffer socket; consisting for instance of two channel sections 42, 42 rigidly connected by upper and lower plates 43, 44 and having a curved contact plate 45 welded to its outer end. A bolt 46 passed through the socket and through slots 47 in the buffer head, retains the latter within the socket.

I claim:

1. A chassis for a tipping truck of the kind described, comprising a single straight longitudinal member of tubular cross-section, means welded to said member for supporting it on wheel axles, and body supporting posts passing through the longitudinal member intersecting it each at two points and welded thereto at the intersections.

2. A chassis for a tipping truck of the kind described, comprising a single straight longitudinal member of tubular cross-section, means welded to said member for supporting it on wheel axles, and body supporting posts each passing through the longitudinal member and intersecting it at two points and welded thereto at the two points of intersection.

3. A chassis for a tipping truck of the kind described, comprising a single longitudinal member consisting of a straight length of pipe, body supporting posts each comprising a length of pipe extending through and intersecting with the longitudinal pipe and welded thereto at the intersections, a transverse rocker saddle carried by each post, and transverse axle bearers on the longitudinal pipe.

4. A chassis for a tipping truck of the kind described, comprising a single straight tubular longitudinal member, means for supporting said member on wheel axles, body supporting posts extending through the longitudinal member and thereby forming the bases of sockets the walls of which are formed by the ends of the longitudinal member, and resilient buffer structures retained in said sockets.

5. A chassis for a tipping truck of the kind described comprising a single straight longitudinal member of tubular cross-section, body supporting posts, each formed of a single length of structural metal section extending through the longitudinal member near to each end thereof and welded thereto at the two points of its intersection therewith, rocker saddles carried by the posts for supporting the tipping body of the truck, and transverse axle bearers welded to the longitudinal member and formed of structural metal section.

6. A chassis for a tipping truck of the kind described, comprising a single straight longitudinal member consisting of a length of pipe, body supporting posts, each formed of a single length of structural metal section extending through the pipe near to one end thereof and welded thereto at the two points of intersection therewith, rocker saddles carried by the posts for supporting the tipping body of the truck, and transverse axle bearers welded to the pipe and formed of structural metal section.

7. A chassis for a tipping truck of the kind described, comprising a single straight longitudinal member consisting of a length of pipe, body supporting posts, each formed of a single length of structural metal welded to the pipe near to each end thereof, a fore and aft diagonal stiffening member extending between each post and the pipe, rocker saddles on the posts for carrying the tipping body of the truck, and transverse axle bearers welded to the pipe and formed of structural metal section.

8. A chassis for a tipping truck of the kind described comprising a single straight longitudinal member of tubular cross-section, body supporting posts, each formed of a single length of structural metal, extending through the longitudinal member near to each end thereof and welded thereto at the intersecting surfaces, a fore and aft diagonal stiffening member extending between each post and the longitudinal member, rocker saddles on the posts for carrying the tipping body of the truck, lateral diagonal stiffening members extending between each post and its saddle, and transverse axle bearers welded to the longitudinal member and formed of structural metal section.

9. A chassis for a tipping truck of the kind described, comprising a single straight longitudinal member of tubular cross-section, body supporting posts, each formed of a single length of structural metal section extending through said longitudinal member near to each end thereof, so as to form the base of a socket the walls of which are formed by the longitudinal member, each post being welded to the longitudinal member at the two points of its intersection therewith, resilient buffer structures retained in said sockets, rocker saddles carried by the posts for supporting the tipping body of the truck, and transverse axle bearers welded to the longitudinal member and formed of structural metal section.

10. A chassis for a tipping truck of the kind described, comprising a single straight longitudinal member consisting of a length of pipe, body supporting posts, each formed of a single length of structural metal section extending through said pipe, so as to form the base of a socket the walls of which are formed by the extreme ends of the pipe, each post being welded to the pipe member at the two points of its intersection therewith, resilient buffer structures retained in said sockets, rocker saddles carried by the posts for supporting the tipping body of the truck, and transverse axle bearers welded to the pipe and formed of structural metal section.

11. A chassis for a tipping truck of the kind described, comprising a single straight longitudinal member, body supporting posts welded to the longitudinal member near to each end thereof and each formed of a single length of structural metal section, rocker saddles carried by the posts for supporting the tipping body of the truck, and transverse axle bearers of a section presenting a flat under surface and an upward flange portion, said upward portion and the longitudinal member intersecting one another and being welded together at the intersection.

12. A chassis for a tipping truck of the kind described, comprising a single straight longitudinal member consisting of a length of pipe, body supporting posts welded to the pipe near to each end thereof and each formed of a single length of structural metal section, rocker saddles carried by the posts for supporting the tipping body of the truck, and transverse axle bearers of a section presenting a flat under surface and an upward flange portion, said flange portion and the pipe intersecting one another and being welded together at the intersection.

13. A chassis for a tipping truck of the kind described, comprising a single straight longitudinal member consisting of a length of pipe, body supporting posts, each formed of a single length of pipe extending through the longitudinal pipe and welded thereto at the two points of intersection therewith, rocker saddles carried by the posts for supporting the tipping body of the truck, and transverse axle bearers welded to the longitudinal pipe and formed of structural metal section.

14. A chassis for a tipping truck of the kind described, comprising a single straight longitudinal member consisting of a length of pipe, body supporting posts, each consisting of a single length of pipe welded to the longitudinal pipe near to each end thereof, rocker saddles carried by the posts for supporting the tipping body of the truck, and transverse axle bearers of a section presenting a flat under surface and an upward flange portion, said flange portion and the longitudinal pipe intersecting one another and being welded together at the intersection.

OTTO MARTIN EBELL.